United States Patent
Bortolotto et al.

(10) Patent No.: US 6,738,825 B1
(45) Date of Patent: May 18, 2004

(54) METHOD AND APPARATUS FOR AUTOMATICALLY PROVISIONING DATA CIRCUITS

(75) Inventors: Robert L. Bortolotto, Santa Rosa, CA (US); Carmel Chi Him Lau, Petaluma, CA (US); Michael F. Davis, Penngrove, CA (US); Xiao Pin Nie, Petaluma, CA (US); David A. Hillard, Novato, CA (US); Steven H. Goody, Santa Rosa, CA (US); Daniel Scott Terhune, Santa Rosa, CA (US)

(73) Assignee: Cisco Technology, Inc, San Jose, CA (US)

( * ) Notice: Subject to any disclaimer, the term of this patent is extended or adjusted under 35 U.S.C. 154(b) by 823 days.

(21) Appl. No.: 09/625,662

(22) Filed: Jul. 26, 2000

(51) Int. Cl.[7] .............................................. G06F 15/173
(52) U.S. Cl. ....................... 709/238; 709/202; 709/223; 709/239; 709/242; 370/236; 370/238; 370/254; 370/351
(58) Field of Search ................................ 709/200–202, 709/216–217, 220–224, 238–242, 249; 370/235–238, 252, 254–255, 351, 355–356, 400

(56) References Cited

U.S. PATENT DOCUMENTS

| | | | |
|---|---|---|---|
| 5,031,093 A | * | 7/1991 | Hasegawa .................... 709/241 |
| 5,613,068 A | * | 3/1997 | Gregg et al. ................. 709/216 |
| 6,262,976 B1 | * | 7/2001 | McNamara .................. 370/254 |
| 6,456,600 B1 | * | 9/2002 | Rochberger et al. ........ 709/220 |
| 6,574,669 B1 | * | 6/2003 | Weaver ....................... 709/239 |

* cited by examiner

Primary Examiner—Bharat Barot
(74) Attorney, Agent, or Firm—Ritter, Lang & Kaplan LLP

(57) ABSTRACT

The present invention discloses a method and apparatus for automatically provisioning data stitching circuits within a network element (NE). Data circuits are defined as the interface cards within NE that are receiving a particular data stream. Data stitching circuits are defined as data circuits that are provided with a destination point and a next destination point for each interface card. The NE creates a data-stitching matrix that identifies a path (i.e., destination and next destination) for the data stream to follow. The matrix is used by a cross-connect to reroute the data stream around one or more inoperable interface cards. When interface cards within the NE request to be provisioned into or out of a data stitching circuit the NE automatically updates the data-stitching matrix.

41 Claims, 12 Drawing Sheets

METHOD AND APPARATUS FOR AUTOMATICALLY PROVISIONING DATA CIRCUITS

BACKGROUND OF THE INVENTION

Telecommunications systems are carrying increasing amounts of information, both in long distance networks as well as in metropolitan and local area networks. At present, data traffic is growing much faster than voice traffic, and includes high bandwidth video signals. In addition to the requirement for equipment to carry increasing amounts of telecommunication traffic there is a need to bring this information from the long distance networks to businesses and to locations where it can be distributed to residences over access networks.

The equipment, which has been developed to carry large amounts of telecommunication traffic, includes fiber optic transport equipment that can carry high-speed telecommunication traffic. The data rates on fiber optic systems can range from millions of bits per second (Mb/s) to billions of bits per second (Gb/s). In addition, multiple wavelengths of light can be carried on an optical fiber using Wavelength Division Multiplexing (WDM) techniques.

The ability to carry large amounts of telecommunication traffic on an optical fiber solves the long-distance point-to-point transport problem, but does not address the issue of how to add and remove traffic from the high-speed data stream. Equipment for adding and removing traffic has been developed and is referred to as "add-drop" multiplexers (ADMs).

Traditional designs for ADMs are based on the use of multiple interface cards which receive high-speed data streams, create a time division multiplex signal containing the multiple data streams, and route the time division multiplex signal to a cross-connect unit which can disassemble the data streams, remove or insert particular data streams, and send the signal to another interface card for transmission back into the networks. By aggregating the multiple data streams into a time division multiplexed data signal, the data rate of the time division multiplexed signal is by definition several times the rate of the maximum data rate supported by the interface cards. Traditional ADMs have proven adequate for interface data rates in the range of 155 Mb/s to 622 Mb/s.

However, optical signals of at least 2.4 Gb/s have become standard, and numerous problems arise with traditional ADMs due to the timing associated with the multiplexing and transmission of the high-speed signals between the interface cards and the cross-connect unit. Thus, there is a need for cross-connect equipment which can support multiple high-speed data streams (i.e., at least 2.4 Gb/s).

Standardized interfaces and transmission hierarchies for telecommunication signals have been developed and include Pleisochronous Digital Hierarchy (PDH), Synchronous Digital Hierarchy (SDH) standards, and Synchronous Optical Network (SONET). In addition to these telecommunication transport standards, standards have been developed for interconnecting businesses and computers within businesses. These Metropolitan and Local Area Network (MAN/LAN) standards include Ethernet, Gigabit Ethernet, Frame Relay, and Fiber Distributed Data Interface (FDDI). Other standards, such as Integrated Services Digital Network (ISDN) and Asynchronous Transfer Mode (ATM) have been developed for use at both levels.

Individual pieces of equipment can be purchased to support telecommunication or MAN/LAN standards. However, these devices generally either connect data streams using a single protocol or convert entire data streams from one protocol to another. Thus, there is a need for a device that can establish interconnectivity between interfaces at the MAN/LAN level, while providing cross-connection to interfaces at the telecommunication network level.

Multiple interfaces are presently supported in ADMs using different interface cards. High-speed interface cards must be inserted into particular slots in order to insure that the high-speed signals can be transported to and from the cross-connect unit and to and from the high-speed interface cards. It would be desirable to have a device in which all cards can support high-speed optical signals of at least 2.4 Gb/s, regardless of the card slot they are located in. Moreover, it would also be useful to have a device that would support routing, bridging, and concentration functions within MANs/LANs, as well as permitting access to telecommunication networks.

A data circuit is defined as all of the interface cards within a particular ADM that a particular data stream is transmitted to. If a particular interface card becomes inoperable, for example is removed, the data circuit becomes open. Thus, there is a need for a method and apparatus for rerouting data streams within the data circuit when one of the interface cards forming the data circuit becomes inoperable. Moreover, the makeup of the data circuit may be continually changing. Thus, there is a need for a method and apparatus for automatically updating the data circuit.

For the foregoing reasons, there is a need for a flexible cross-connect apparatus that includes a data plane and can support multiple high-speed optical interfaces in any card slot. Furthermore, the flexible cross-connect apparatus should establish connectivity between data cards and the telecommunication networks. Moreover, the flexible cross-connect apparatus should be able to maintain a data circuit by rerouting data streams when one interface card within the circuit becomes inoperable.

SUMMARY OF THE INVENTION

The present invention discloses a method and apparatus for automatically provisioning data stitching circuits within a network element (NE). Data circuits are defined as the interface cards within NE that are receiving a particular data stream. Data stitching circuits are defined as data circuits that are provided with a destination point and a next destination point for each interface card. The NE creates a data-stitching matrix that identifies a path (i.e., destination and next destination) for the data stream to follow. The matrix is used by a cross-connect to reroute the data stream around one or more inoperable interface cards. When interface cards within the NE request to be provisioned into or out of a data stitching circuit the NE automatically updates the data-stitching matrix.

According to one embodiment, a method for automatically provisioning data streams received by a network element to the devices within the network element that desire to receive the data stream is disclosed. The method including requesting provisioning data for each of the devices within the network element; receiving a response from each device, wherein the response indicates which of the data streams the device wants to receive; organizing all of the responses so as to create a list of devices for each data stream; computing a path for each data stream within the network element; and generating a matrix for each path, wherein for each leg of the path the matrix includes a source point and a destination point.

According to one embodiment, a method for routing data streams received at a network element to the appropriate devices within the network element is disclosed. The method includes determining devices installed within the network element; requesting provisioning data from each of the installed devices; receiving provisioning data from each of the installed devices, wherein the provisioning data includes the data streams the device wants to receive; computing a path for each data stream within the network element, the path including multiple legs with each leg consisting of a source point and a destination point; generating a matrix for each path, wherein the matrix includes a next destination point and a previous source point for each applicable leg; and routing a data stream to the appropriate devices within the network element based on the matrix for the data stream.

According to one embodiment, a computer program embodied on a computer readable medium for automatically provisioning data streams received by a network element to the devices within the network element that desire to receive the data stream is disclosed. The computer program includes a code segment for requesting provisioning data for each of the devices within the network element; a code segment for receiving a response from each device, wherein the response indicates which of the data streams the device wants to receive a code segment for organizing all of the responses so as to create a list of devices for each data stream; a code segment for computing a path for each data stream within the network element; and a code segment for generating a matrix for each path, wherein for each leg of the path the matrix includes a source point and a destination point.

According to one embodiment, a computer program embodied on a computer readable medium for routing data streams received at a network element to the appropriate devices within the network element is disclosed. The computer program includes a code segment for determining devices installed within the network element; a code segment for requesting provisioning data from each of the installed devices; a code segment for receiving provisioning data from each of the installed devices, wherein the provisioning data includes the data streams the device wants to receive; a code segment for computing a path for each data stream within the network element, the path including multiple legs with each leg consisting of a source point and a destination point; a code segment for generating a matrix for each path, wherein the matrix includes a next destination point and a previous source point for each applicable leg; and a code segment for routing a data stream to the appropriate devices within the network element based on the matrix for the data stream.

According to one embodiment, a network element capable of automatically provisioning a data circuit is disclosed. The network element includes a plurality of interface cards for receiving and transmitting data streams; a cross-connect for connecting each of the plurality of interface cards to each other; a backplane for connecting each of the plurality of interface cards to the cross-connect; and a control unit for controlling the operation of the network element including requesting and receiving provisioning data from the plurality of interface cards, defining a data circuit based on the interface cards wishing to receive a particular data stream, determining a path for the particular data stream to follow in order to traverse each interface card within the data circuit, defining the path in a matrix for the cross-connect to use in routing the data stream, wherein the matrix includes for each port of the cross-connect associated with an interface card that is part of the data circuit a source port and a destination port, and storing the matrix.

According to one embodiment, an apparatus for generating a matrix that defines how a data stream should be routed within a network element is disclosed. The apparatus includes means for obtaining provisioning data from a plurality of interface cards; means for defining a data circuit based on the obtained provisioning data as those interface cards desiring to receive the data stream; means for determining an order for the data stream to traverse all the interface cards within the data circuit; and means for generating the matrix based on the order.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENTS

Figure 1:
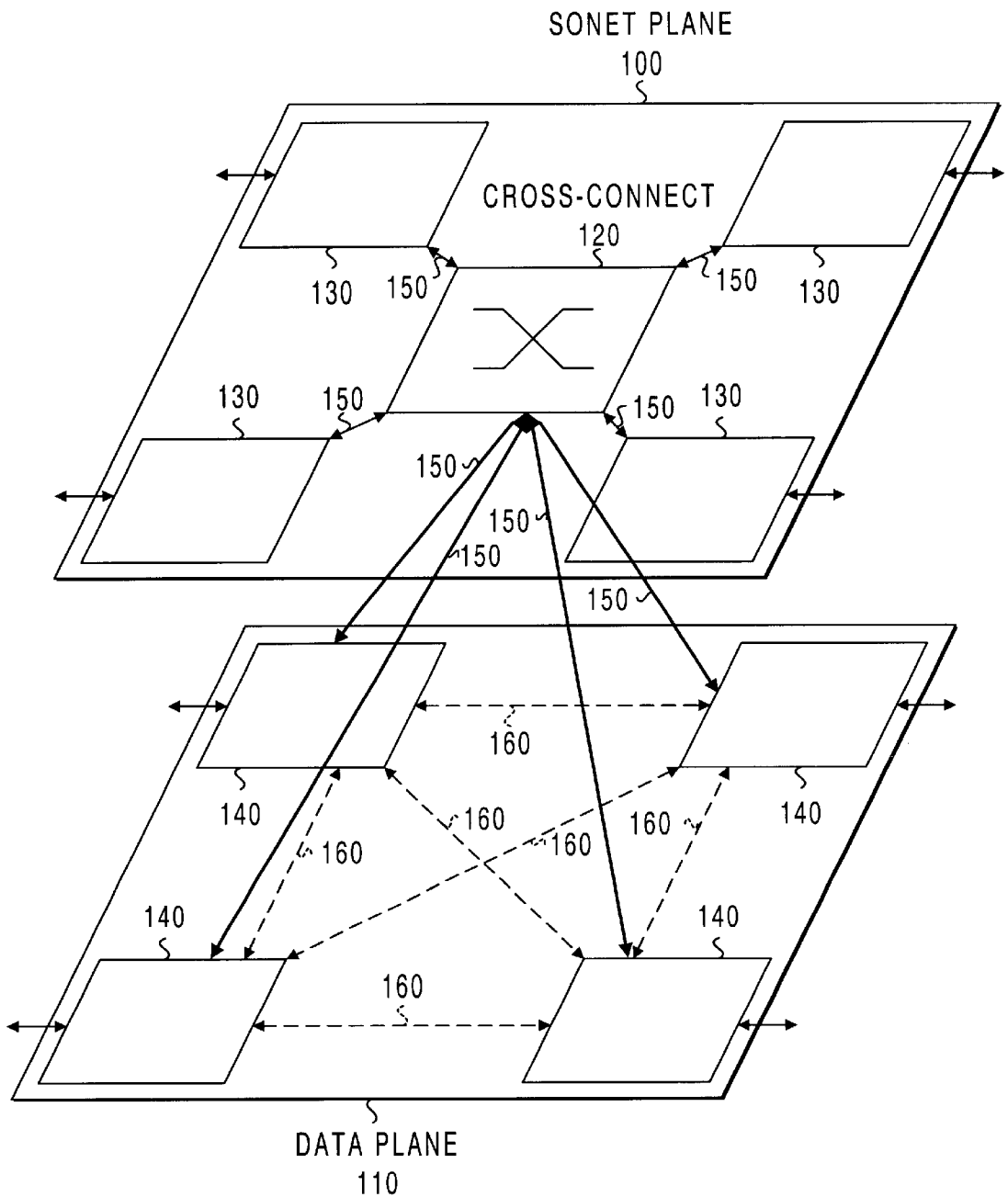
FIG. 1 illustrates a block diagram of the flexible cross-connect system, according to one embodiment.

In describing a preferred embodiment of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 1 through 9 in particular, the apparatus and method of the present invention are disclosed.

Flexible cross-connect systems support numerous telecommunication and networking standards, including the following that are incorporated herein by reference:

Bellcore Standard GR-253 CORE, Synchronous Optical Network (SONET) Transport Systems: Common Generic Criteria, Issue 2, December 1995;

Bellcore Standard GR-1400 CORE, SONET Unidirectional Line-Switched Ring Equipment Generic Criteria;

Bellcore Standard GR-1230 CORE, SONET Bi-directional Line-Switched Ring Equipment Generic Criteria, Issue 3A, December 1996;

Bellcore TR-NWT-000496, SONET Add-Drop Multiplex Equipment (SONET ADM) Generic Criteria, Issue 3, May 1992;

Bellcore Transport System Generic Requirements FR-440, Issue No. 98, September 1998; IEEE/ANSI 802.3 Ethernet LAN specification; and Networking Standards, by William Stallings, published by Addison-Wesley Publishing Company (New York, 1993).

A master architecture of a flexible cross-connect system is defined in co-pending U.S. application Ser. No. 09/274,078 filed entitled "Flexible Cross-Connect with Data Plane" filed on Mar. 22, 1999. The basic software architecture of the flexible cross-connect system is disclosed in co-pending U.S. application Ser. No. 09/533,421 entitled "Method and Apparatus for Controlling the Operation of a Flexible Cross-Connect System" filed on Mar. 22, 2000. The basic timing operations of the flexible cross-connect system are disclosed in co-pending U.S. application Ser. No. 09/532,611 entitled "Method and Apparatus for Routing Telecommunication Signals" filed on Mar. 22, 2000. U.S. application Ser. Nos. 09/274,078, 09/533,421 and 09/532,611 are herein incorporated by reference in their entirety.

FIG. 1 illustrates a block diagram of a flexible cross-connect system 10, hereinafter referred to as a Network Element (NE) 10, capable of routing traffic across two high-bandwidth planes. The NE 10 includes a telecommunication plane 100, such as a SONET plane, and a data plane 110. The telecommunication plane 100 includes telecommunication plane network interface subsystems 130, and the data plane 110 includes data plane network interface subsystems 140. A centralized fully non-blocking cross-connect unit (XC) 120 is located in the telecommunication plane 100, which interfaces with the telecommunication plane network interface subsystems 130 and the data plane network interface subsystems 140.

Standardized telecommunication traffic, such as SONET, Synchronous Digital Hierarchy (SDH) and Pleisochronous Digital Hierarchy (PDH), and other Time Division Multiplexed (TDM) or Wavelength Division Multiplexed (WDM) traffic, enters the system through the telecommunication plane network interface subsystems 130, such as electrical or optical interface subsystems. The telecommunication traffic is transmitted from the telecommunication plane network interface subsystems 130 over point-to-point connections 150 to the XC 120. The XC 120 processes the telecommunication traffic and then transmits the processed data back to a telecommunication network, such as a Wide Area Network (WAN), or transmits the processed data to a data network, such as a Metropolitan or Local Area Network (MAN/LAN). The processed data is transmitted to the telecommunication network via the telecommunication plane network subsystem(s) 130, and to the data network via the data plane network interface subsystem(s) 140.

Standardized telecommunication signals include, but are not limited to, DS-1 (1.5 Mb/s), B-ISDN (1.5 Mb/s) DS-2 (6.3 Mb/s), DS-3 (44.7 Mb/s), CEPT-1 (2.048 Mb/s), CEPT-2 (8.45 Mb/s), CEPT-3 (34.37 Mb/s), CEPT-4 (139.3 Mb/s), electrical STS-1 and its multiples, electrical STM-1 and its multiples, and optical OC-1 and its multiples. Other standardized and non-standardized transmission signal formats can be supported and are understood by those skilled in the art.

Standardized data traffic, such as Ethernet, enters the system through the data plane network interface subsystems 140, such as electrical or optical interface subsystems. The data plane network interface subsystems 140 communicate with the XC 120 via point-to-point connections 150. The data plane 110 also allows for communications between data plane network interface subsystems 140 via-point-to-point connectors 160. Thus, the data traffic can be processed by multiple data plane interface subsystems 140 before being transmitted to the XC 120 or back to the data network. As with the telecommunication traffic, the XC 120 processes the data traffic and transmits the processed data to a telecommunication network or a data network.

Standardized data signals include, but are not limited to, packet data transport formats such as Frame Relay, Asynchronous Transfer Mode (ATM), and Integrated Services Digital Network (ISDN); and MAN/LAN formats such as Ethernet, Fiber Distributed Data Interface (FDDI), and Token Ring. The interfaces supported by the data plane network interface subsystems 140 include electrical Ethernet interfaces such as 10 BaseT, 100 BaseT, and 1000 BaseT as well as optical interfaces such as Gigabit Ethernet and OC-12 Packet-over-SONET (POS). Other data-centric interfaces can be used and are understood by those skilled in the art.

In one embodiment, the point-to-point connections 150 between the XC 120 and the telecommunication plane network interface subsystems 130 or between the XC 120 and the data plane network interface subsystems 140 are all in a single specified format. For example, in a preferred embodiment, all the point-to-point connections 150 are high-speed connections realized as Synchronous Transfer Signal (STS)-192 formatted signals. The STS-192 signals are transported on a multi-trace electrical bus formed on a high-speed backplane.

Figure 2:
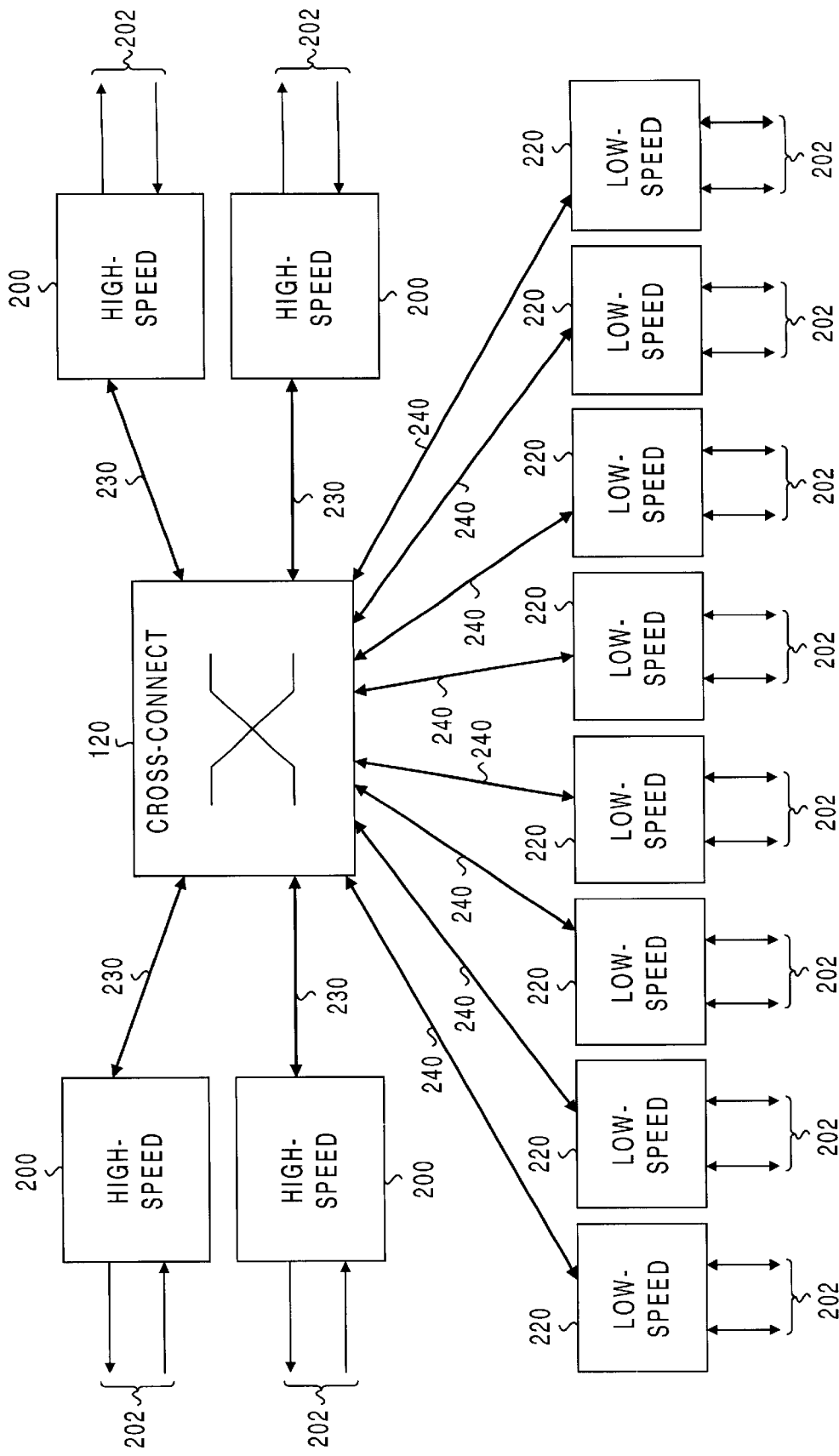
FIG. 2 illustrates a functional diagram of the flexible cross-connect system, according to one embodiment.

In an alternative embodiment, as illustrated in FIG. 2, specific network interface subsystems are designated as high-speed interface subsystems 200 and others are designated as low-speed interface subsystems 220 having corresponding high-speed connections 230 and low-speed connections 240 to the XC 120. For example, the low-speed interconnections 240 may operate at the STS-48 rate of 2.488 Gb/s, while the high-speed interconnections 230 may operate at the STS-192 rate of 9.953 Gb/s.

The high speed network interface subsystems 200 may be realized as printed circuit boards containing active and passive electrical and optical components, and may contain multiple network interfaces 202 operating at the same or different speeds. The low speed network interface subsystems 220 may also be realized as printed circuit boards with active and passive electrical and optical components, and can contain multiple network interfaces 202 operating at the same or different speeds. As an example, a low speed network interface subsystem 220 can be realized as a DS-1 interface board supporting 14 DS-1 interfaces. Alternatively, a low speed network interface subsystem 220 can be realized as an Ethernet board supporting multiple Ethernet interfaces.

Figure 3:
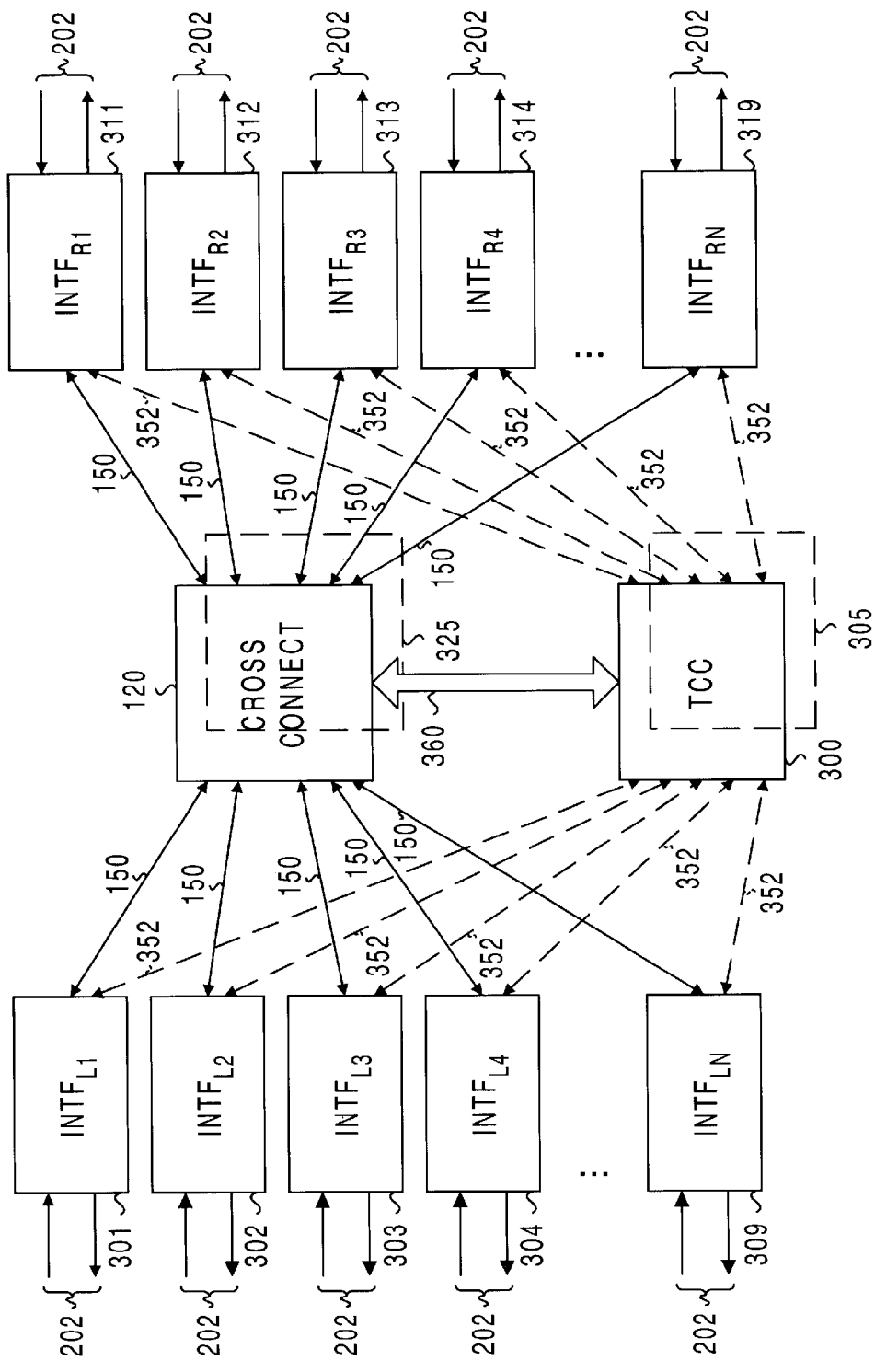
FIG. 3 illustrates communication channels between elements of the flexible cross-connect system, according to one embodiment.

As illustrated in FIG. 3, the XC 120 has direct point-to-point connections 150 with each interface subsystem 301, 302, 303, 304, 309, 311, 312, 313, 314, 319. Each of the interface subsystems 301–304, 309, 311–314, and 319 represents an interface card which is either of the class of cards which are telecommunication plane network interface subsystems 130 (high-speed) or which are data plane network interface subsystems 140 (low-speed). The designation L and R in network interface subsystems 301–304, 309, 311–314, and 319 are used to simply designate left-hand side or right hand-side of a mechanical configuration, but are not intended to be architectural limitations.

Referring to FIG. 3, there are multiple point-to-point System Communication Links (SCLs) 352 between a centralized timing, control, and communications subsystem (TCC) 300 and each of the interface subsystems 301–304, 309, 311–314, and 319. The TCC 300 is also directly connected to the XC 120 via a TCC to XC communication bus 360. In a preferred embodiment, the system has redundant XC 325 and a redundant TCC 305.

Figure 4A:
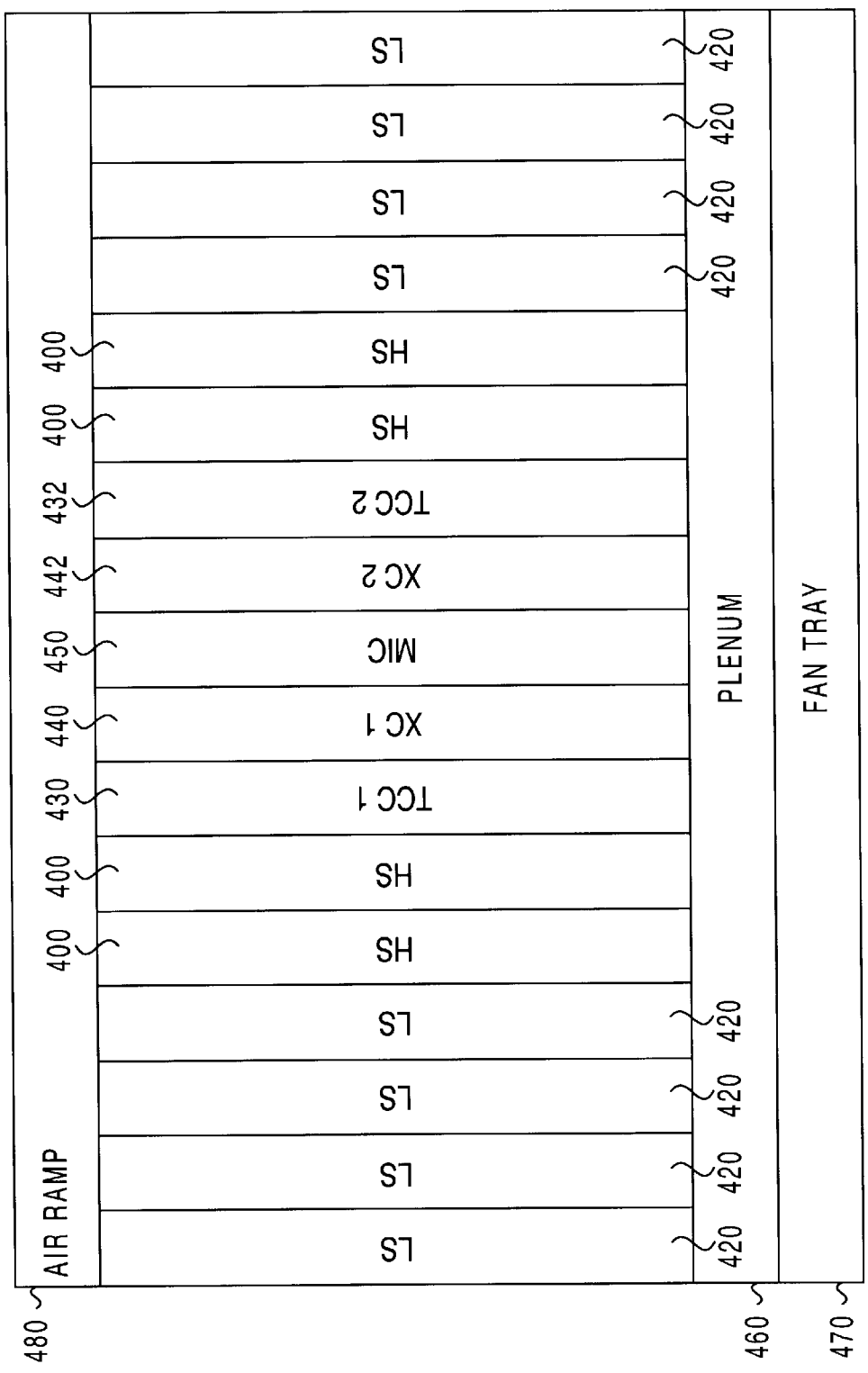
FIGS. 4A and 4B illustrates the mechanical (rack) configuration of the flexible cross-connect system, according to one embodiment.
Figure 4B:
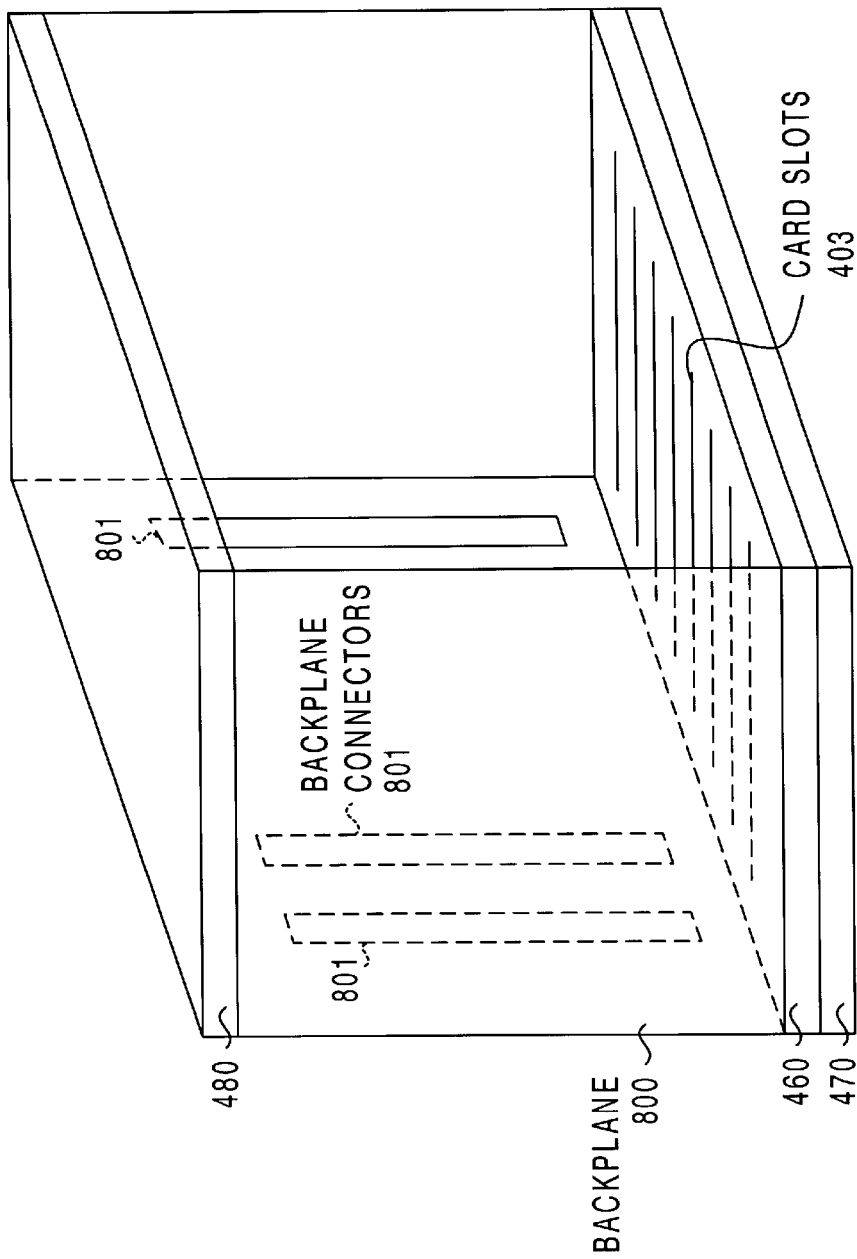

FIGS. 4A and 4B illustrates the NE 10 as a rack 400 with card slots. The rack consists of a card cage, a backplane 800, and set of plug-in cards. Mechanical card guides and backplane connectors 801 on the backplane 800 form card slots 403. As illustrated, the card slots 403 in the card cage are numbered from 1 to 17, left to right. The plug-in cards are grouped into two general groups. The first group is the common equipment cards, which include a XC card 440, a redundant XC card 442, a TCC card 430, a redundant TCC card 432, and a Miscellaneous Interface Card (MIC) 450. The second group is the network interface cards and includes low speed cards 420 and high speed cards 400, which form the telecommunication plane network interface subsystems 130 and the data plane network interface subsystems 140.

As illustrated in FIG. 4A, high-speed network interface cards 400 and low speed network interface cards 420 are supported. In one embodiment, the high speed network interface cards 400 support one or more electrical and optical interfaces up to Optical Carrier (OC)-192 data rates, while the low speed network interface cards 420 support data rates of up to OC-48. Traffic carried through these network interfaces is routed over the backplane 800 to the XC card 440 or the redundant XC card 442.

Figure 5:
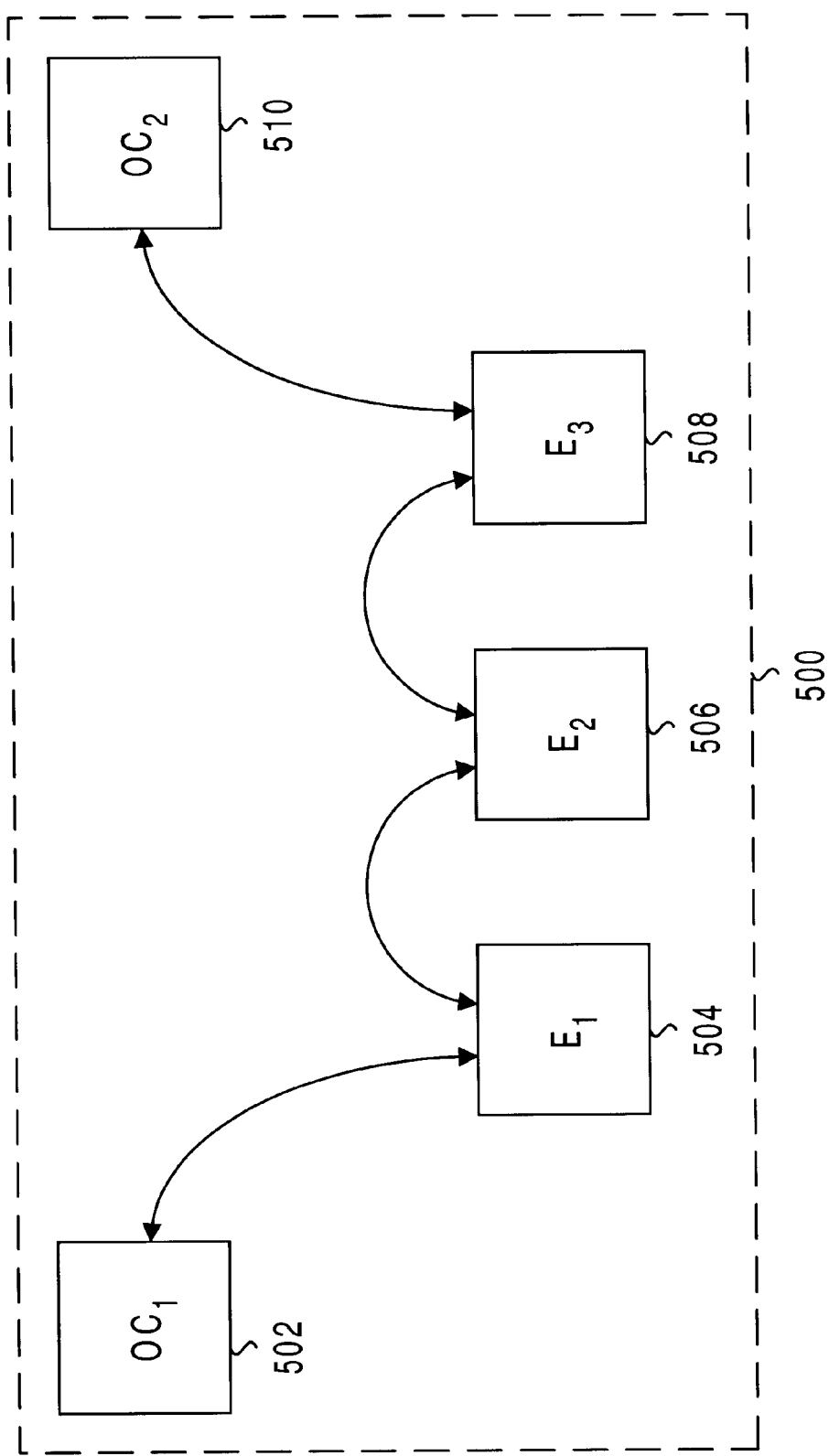
FIG. 5 illustrates a data circuit within the flexible cross-connect system, according to one embodiment.

FIG. 5 illustrates an example data circuit within the NE 10. In this example, the NE 10 is configured as an ADM 500. The data circuit consists of a first high-speed (SONET) card 502, first, second and third low-speed (Ethernet) cards 504, 506, 508, and a second high-speed card 510. As illustrated the data circuit is a Bi-directional Line-Switched Ring (BLSR) circuit, meaning that the data flows in both directions between interface cards. However, as one skilled in the art would recognize the data circuit could also be a Uni-directional Line-Switched Ring (ULSR) circuit, meaning that data flows in only one direction.

Figure 6:
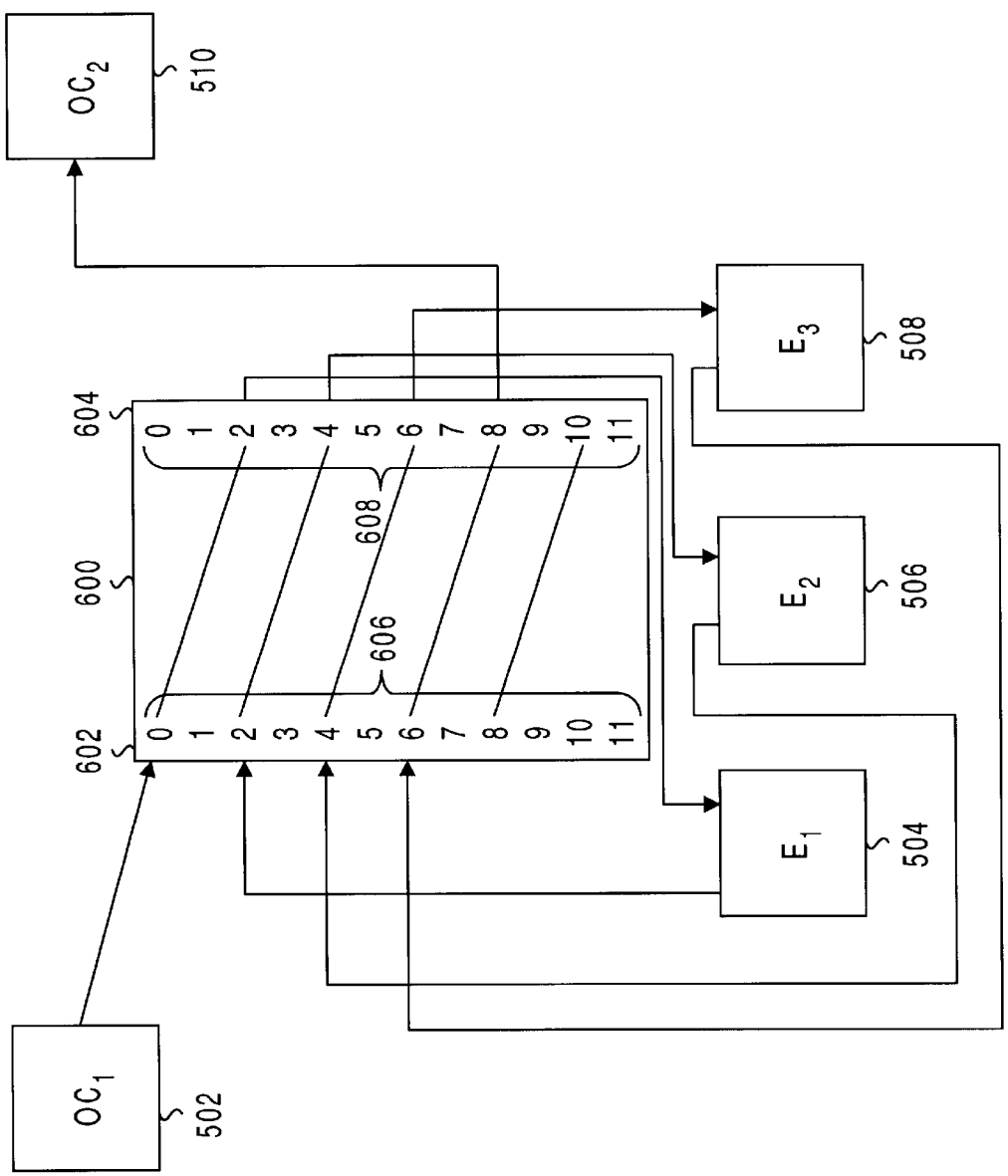
FIG. 6 illustrates the data circuit of FIG. 5 routed through a cross-connect, according to one embodiment.

FIG. 6 illustrates a preferred embodiment of how the data circuit of FIG. 5 would be implemented on the NE 10. However, for simplicity, FIG. 6 illustrates a ULSR circuit. In this embodiment, the connections between each of the interface cards are made through an XC 600. As illustrated the XC 600 has an input side 602 and an output side 604. Both the input side 602 and the output side have an equal number of ports 606, 608. In a preferred embodiment the number of ports 606, 608 is equal to the number of interface cards in the NE 10. Each port 606 is connected to each port 608 so that the XC 600 can be used to connect any interface card to any other interface card. That is, each interface card is stitched to each other interface card. As illustrated, the XC 600 has 12 ports, ports 0–11, corresponding to the interface cards (i.e., physical locations of the interface cards as illustrated in FIG. 4a) in the NE 10. The interface cards 502, 504, 506, 508, 510 are illustrated as ports 0, 2, 4, 6, and 8 accordingly.

In order to maintain the data circuit within the NE 10 in the event that one or more of the interface cards within the data circuit become inoperable for any reason, including the interface card being removed, a matrix is established for each data circuit. The matrix includes, for each output of the XC 600 connected to an interface card (destination point), a source point, a next drop point, and a previous point. The source point is the input of the XC 600 and the destination for a particular data stream. That is, the XC 600 uses the table to route the data stream from the card connected to the input port to the card connected to the output port. The next point is the next card in the data stream that will be receiving data (that is, the next output of the XC 600). In the event that the destination point becomes inoperable, the XC 600 stitches the data stream together by transmitting the data stream from the source point to the next drop point. A data circuit that is identified by such a matrix is known as a data stitch circuit because the XC 600 stitches the circuit back together in the event that one or more interface cards within the data circuit are inoperable.

The previous point identifies where the interface card, associated with the source point, received its data. That is, the previous point is the output from the XC 600 that was received by the source interface card. The previous point is used when an inoperable card that is part of the data stitch matrix becomes operational. This ensures that the appropriate data stream is forwarded.

In a preferred embodiment, the TCC 300 creates and maintains the data stitch matrix for each data circuit. The TCC 300 establishes the data stitch matrix by determining what interface cards within the NE 10 desire to receive a particular data stream. Those interface cards that desire to receive the data stream are added as destination nodes in the cross-stitch matrix. The TCC 300 then organizes the destination nodes and determines the order the data stream will be transmitted to each of the interface cards. Based on the order the TCC 300 can determine the source point, the previous point and the next drop point for each destination point in the data circuit. Once this process is complete, the data is saved in a data stitch matrix that is provisioned to the XC 600. The XC 600 is a passive device that routes the data stream based on the data stitch matrix that is provisioned from the TCC 300.

The operation of how the XC 600 utilizes the cross stitch matrix to reroute data streams for a particular data circuit in the event that one or more interface cards that are part of the data circuit are inoperable, for example removed from the NE 10, is defined in Applicants co-pending application entitled "Method and Apparatus for Rerouting Telecommunication Signals" filed on the same day as this application and having docket number CER1023-00. Application CER10023-00 is herein incorporated by reference in its entirety, but is not admitted to be prior art.

In a preferred embodiment, the TCC 300 supports a "plug and play" type operation. That is, through the backplane 800, the TCC 300 can determine whether or not a card is plugged into a particular slot of the NE 10. When the TCC 300 determines that an interface card is plugged into the slot, the TCC 300 continuously attempts to communicate with the interface card. Once the interface card is up and running, the interface card attempts to establish communications with the TCC 300. The TCC 300 therefore can immediately know when a card is inserted and what type of card it is. For example, the TCC 300 may determine that an E100 Ethernet card was plugged in slot 4 and that an E1000 Ethernet card was plugged in slot 12. The TCC 300 then sends provisioning data to the interface card(s). The interface card(s) review its provisioning and request that it be stitched into one or more data circuits.

Figure 7:
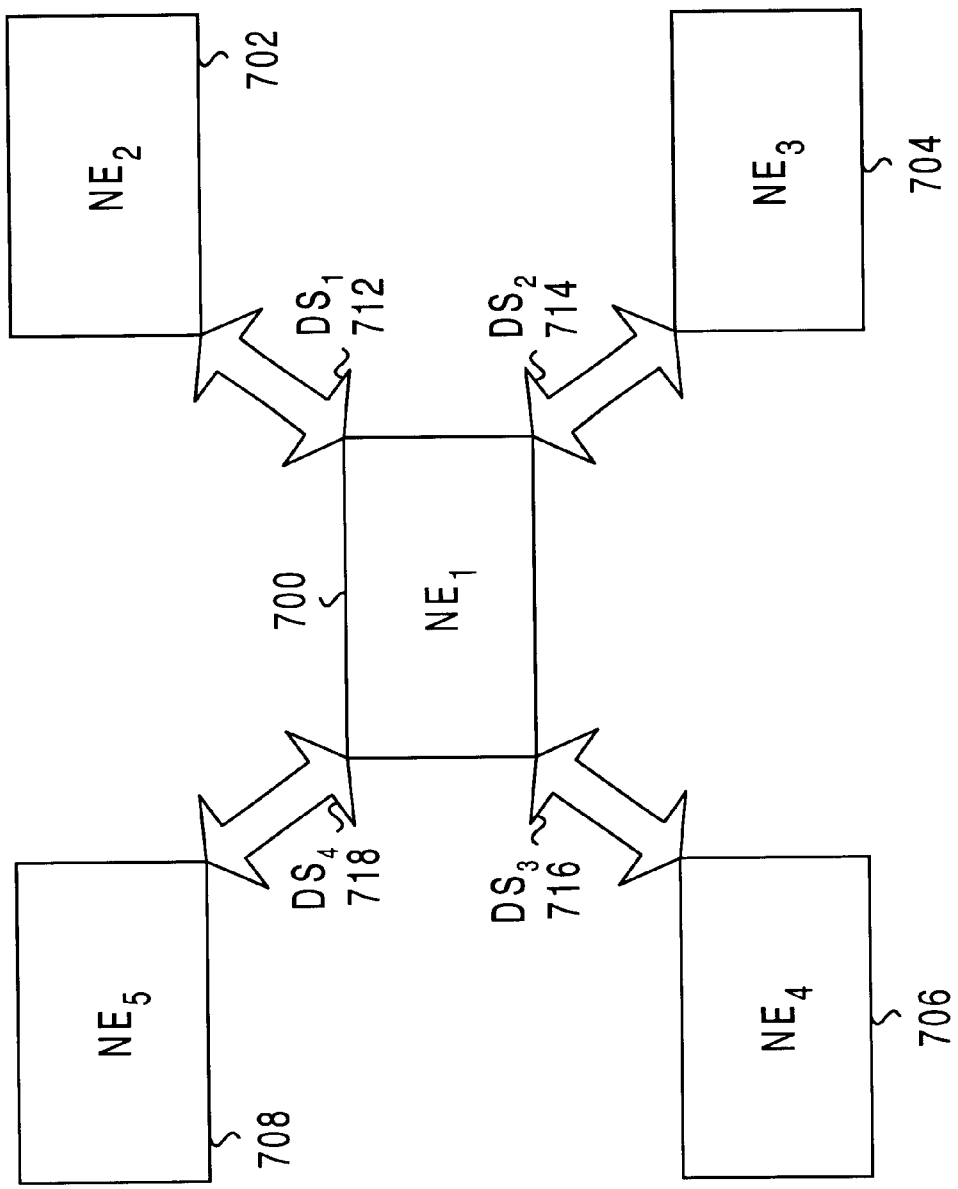
FIG. 7 illustrates a network element receiving multiple data streams, according to one embodiment.

FIG. 7 illustrates a first NE 700 receiving data streams from second, third, fourth, and fifth NEs 702, 704, 706 and 708. As illustrated, data streams 712, 714, 716 and 718 are received at the first NE 700 by the second, third, fourth, and fifth NEs 702, 704, 706 and 708 respectively. The interface cards within the first NE 700 may wish to be provisioned to receive any number of these data streams.

Figure 8:
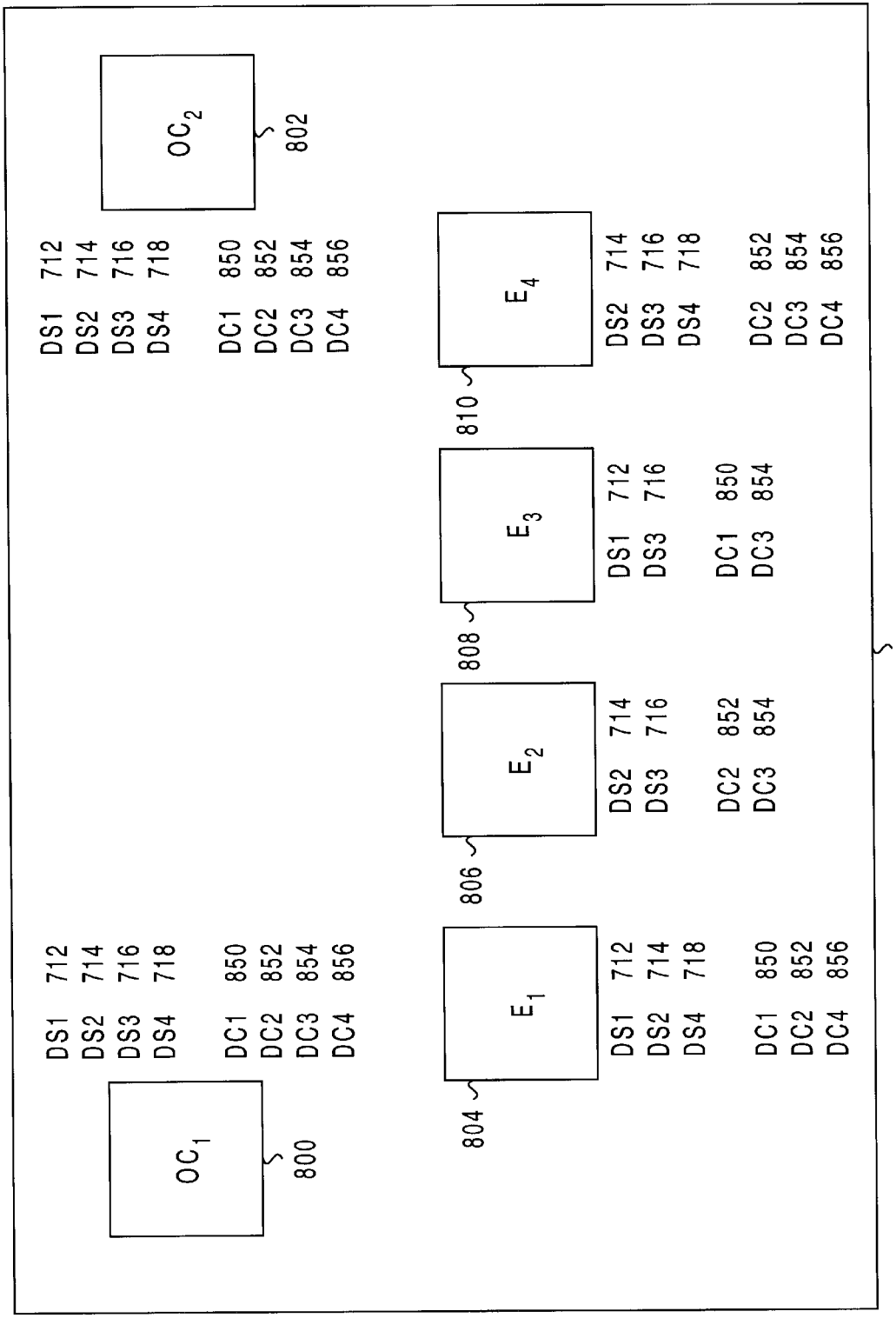
FIG. 8 illustrates data circuits within a network element, according to one embodiment.

FIG. 8 illustrates the first NE 700 having first and second OCs 800, 802 and first, second, third and fourth Ethernet cards 804, 806, 808, 810. This figure is for illustration only. As one skilled in the art would clearly recognize, the NE 700 could have any number of interface cards, for example 12 interface cards as illustrated in FIG. 4A.

In this example, the first Ethernet card 804 is provisioned receive the first, second and fourth data streams 712, 714, 718; the second Ethernet card 806 is provisioned to receive the second and third data streams 714, 716; the third Ethernet card 808 is provisioned to receive the first and third data streams 712, 716; and the fourth Ethernet card 810 is provisioned to receive the second, third and fourth data streams 714, 716, 718. A data circuit is defined for each data stream. Each data circuit consists of the first and second OC cards 800, 802 and each of the Ethernet cards receiving the particular data stream. FIG. 8 and the table below illustrate the data circuits that would be defined for the first NE 700.

| Data Circuit | Corresponding Data Stream | Interface Cards Provisioned |
|---|---|---|
| 850 | 712 | 800, 802, 804, 808 |
| 852 | 714 | 800, 802, 804, 806, 810 |
| 854 | 716 | 800, 802, 806, 808, 810 |
| 856 | 718 | 800, 802, 804, 810 |

Figure 9A:
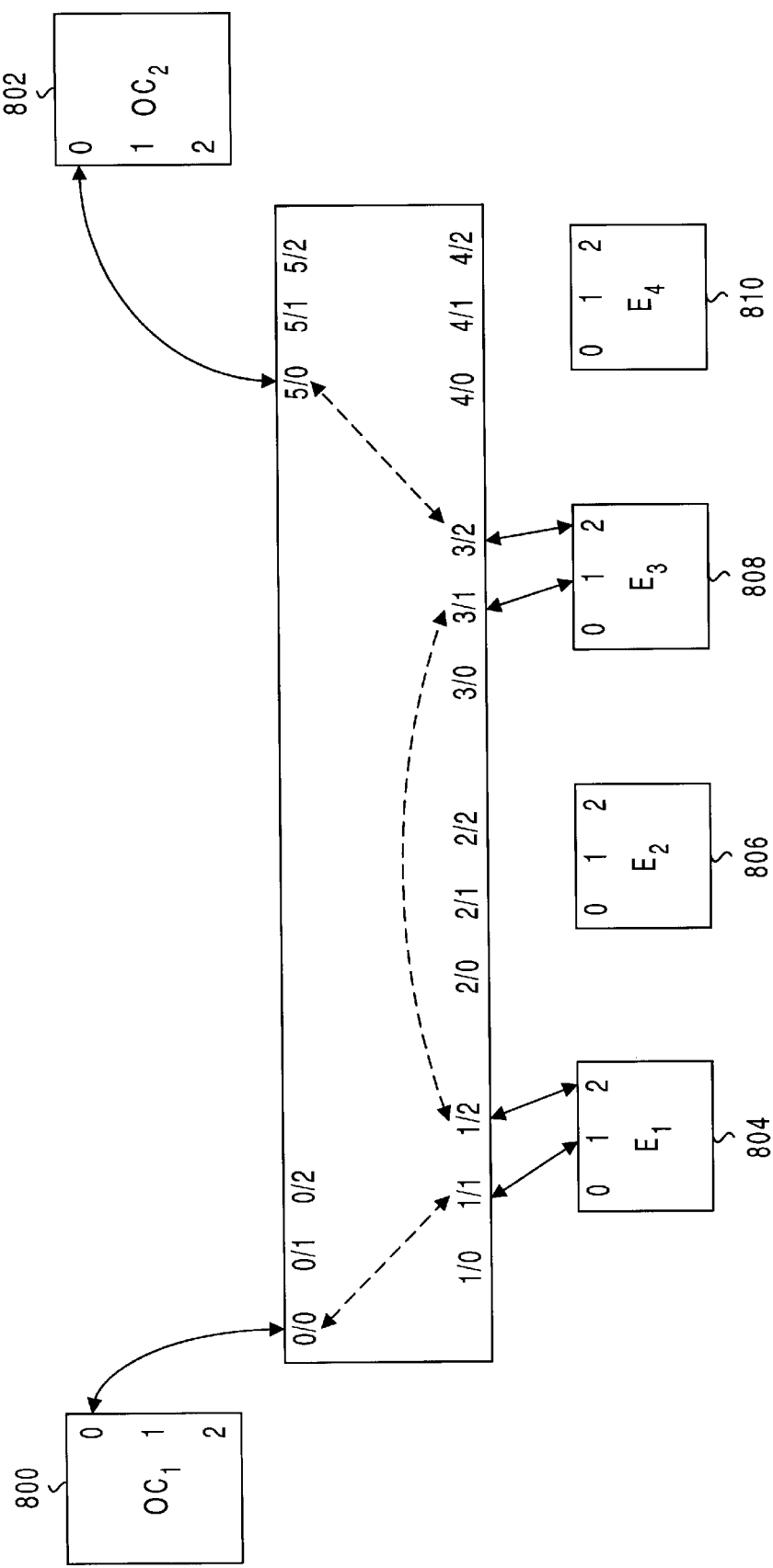
FIGS. 9A–9C illustrate changes in a data circuit, according to one embodiment.

FIG. 9A illustrates data stitch 850 of the first NE 700. This data circuit only consists of four interface cards 800, 802, 804 and 808. The XC 600 for this NE 700 has six sets of input ports and six sets of output ports (labeled 0/x–5/x), each set of ports capable of being associated with an interface card. The /x will be described in detail later. For this example, the first OC card 800 is coupled to a port of port set 0, the first Ethernet card 804 to ports of port set 1, the third Ethernet card 808 to ports of port set 3, and the second OC card 802 to a port of port set 5. At this point the interface cards connected to port sets 2 and 4 (namely the second and fourth interface cards 806, 810) are not provisioned to be part of the first data circuit 850.

It should be noted that the port sets being illustrated on the top or bottom of the XC 600 are purely for illustration and do not represent input ports or output ports. In fact, the illustrated port sets actually represent both input and output ports in FIG. 9A. As one skilled in the art would know, the input ports and the output ports would be separate and communications to the XC 600 would be received at the input ports and communications from the XC 600 would be transmitted from the output ports.

The illustrated NE 700 of FIG. 9A only supports STS-3 communications. Thus, it is only possible for each card to transmit or receive three different type of data streams. That is, each card would be capable of sending STS-1, 2 or 3 data streams (labeled y/0–y/2, where y is the port). For example, an interface card could send three STS-1 streams, one STS-1 stream and one STS-2 stream, or one STS-3 stream. Since each card would be capable of sending one of three different STS streams it is possible that each card would have three ports, one for each type of stream.

It should be noted that FIG. 8 illustrates an STS-3 system for simplicity and does not limit the scope of the invention to such. It would be understood by one skilled in the art that each interface card could support higher-speed signals, for example an STS-192 signal, and that the XC would have an equivalent number of ports, for example 192.

As illustrated in FIG. 9A, the first OC card 800 transmits the data stream out the STS-1 port (labeled STS 0) to the XC 600 (port 0/0). The XC 600 routes the data stream from input port 0/0 to output port 1/1 and transmits the data stream to the STS-2 port (labeled STS 1) on the first Ethernet card 804. The first Ethernet card 804 transmits the data stream out the STS-3 port (labeled STS 2) to the XC 600 (port 1/2). The XC 600 the data stream from input port 1/2 to output port 3/1 and transmits the data stream to the STS-2 port (labeled STS 1) on the third Ethernet card 808. The third Ethernet card 808 transmits the data stream out the STS-3 port (labeled STS 2) to the XC 600 (port 3/2). The XC 600 the data stream from input port 3/2 to output port 5/0 and transmits the data stream to the STS-1 port (labeled STS 0) of the second Ethernet card 802. As illustrated, the XC 600 has a port for each card and each potential STS stream of each card.

The table below illustrates a matrix for the first NE 700 of FIG. 9A. The matrix includes for each port on the XC 600, if applicable, the source port, the next port and the previous port. For example, the first OC card 800 (port 0) is receiving data at its STS-1 port (STS 0) from the STS-2 port (STS 1) of the first Ethernet card 804 (port 1). That is, port 1/STS 1 is the source for port 0/0. The first OC card 800 is the end of the circuit, therefore there is no next port/STS. The first Ethernet card 804 received the data stream at its STS-3 port (STS 2). Thus, port 1/STS 2 is the previous port/STS.

| Port/STS | Source Port/STS | Next Port/STS | Previous Port/STS |
|---|---|---|---|
| 0/0 | 1/1 | N/A | 1/2 |
| 0/1 | N/A | N/A | N/A |
| 0/2 | N/A | N/A | N/A |
| 1/0 | N/A | N/A | N/A |
| 1/1 | 0/0 | 3/1 | N/A |
| 1/2 | 3/1 | 0/0 | 3/2 |
| 2/0 | N/A | N/A | N/A |
| 2/1 | N/A | N/A | N/A |
| 2/2 | N/A | N/A | N/A |
| 3/0 | N/A | N/A | N/A |
| 3/1 | ½ | 5/0 | 1/1 |
| 3/2 | 5/0 | 1/2 | N/A |
| 4/0 | N/A | N/A | N/A |
| 4/1 | N/A | N/A | N/A |
| 4/2 | N/A | N/A | N/A |
| 5/0 | 3/2 | N/A | 3/1 |
| 5/1 | N/A | N/A | N/A |
| 5/2 | N/A | N/A | N/A |

Figure 9B:
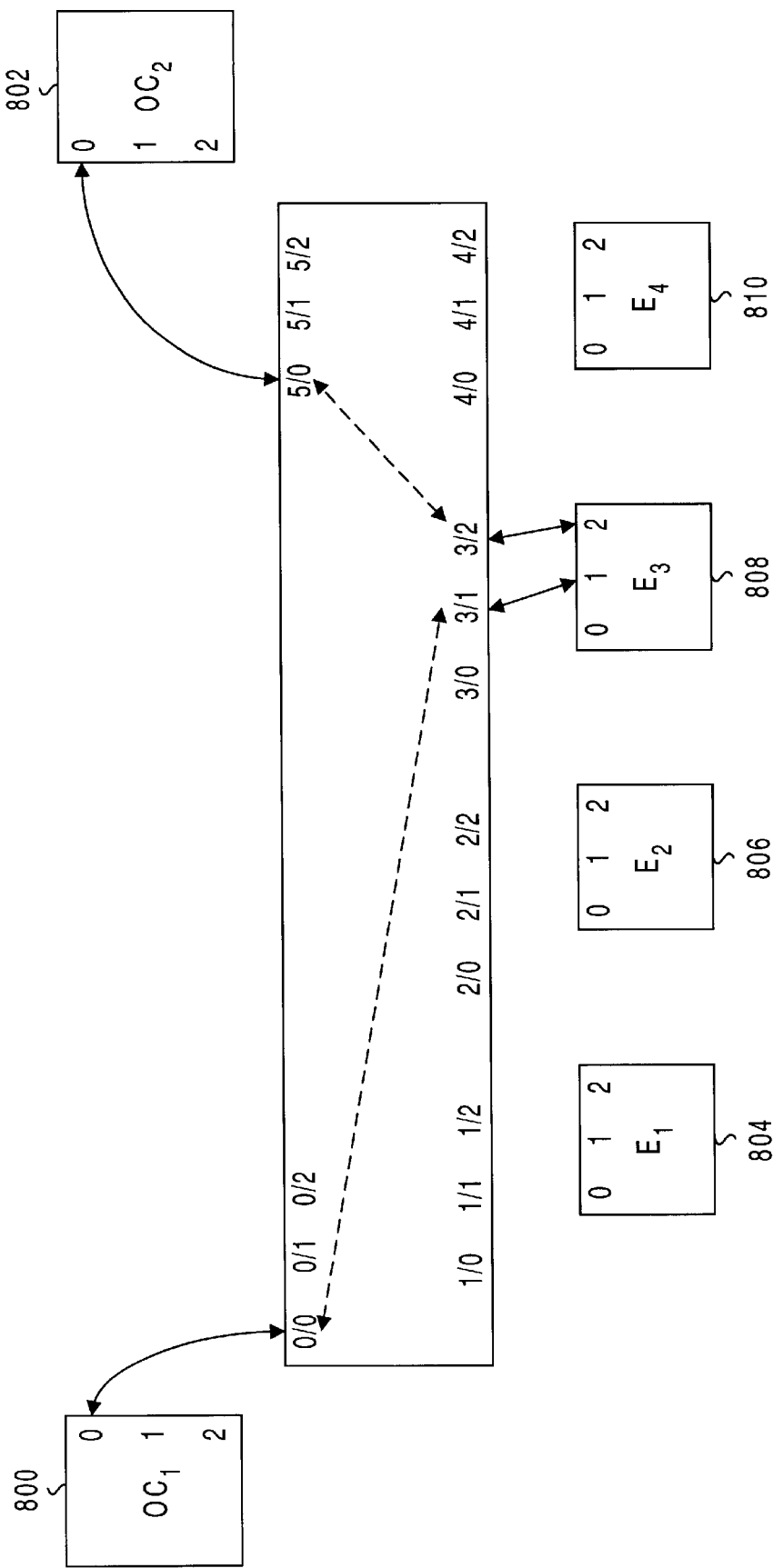

In the event that a particular interface card informs the TCC 300 that it no longer wishes to be provisioned to the particular data circuit, the TCC 300 will update the cross-stitch matrix to remove the particular interface card from that data circuit. For example, as illustrated in FIG. 9B, the first interface card 804 is de-provisioned from the first data circuit 850 and is thus removed from the cross-stitch matrix. The updated cross-stitch matrix is illustrated in the below table.

| Port/STS | Source Port/STS | Next Port/STS | Previous Port/STS |
|---|---|---|---|
| 0/0 | 3/1 | N/A | 3/2 |
| 0/1 | N/A | N/A | N/A |
| 0/2 | N/A | N/A | N/A |
| 1/0 | N/A | N/A | N/A |
| 1/1 | N/A | N/A | N/A |
| ½ | N/A | N/A | N/A |

-continued

| Port/STS | Source Port/STS | Next Port/STS | Previous Port/STS |
|---|---|---|---|
| 2/0 | N/A | N/A | N/A |
| 2/1 | N/A | N/A | N/A |
| 2/2 | N/A | N/A | N/A |
| 3/0 | N/A | N/A | N/A |
| 3/1 | 0/0 | 5/0 | N/A |
| 3/2 | 5/0 | 0/0 | N/A |
| 4/0 | N/A | N/A | N/A |
| 4/1 | N/A | N/A | N/A |
| 4/2 | N/A | N/A | N/A |
| 5/0 | 3/2 | N/A | 3/1 |
| 5/1 | N/A | N/A | N/A |
| 5/2 | N/A | N/A | N/A |

Figure 9C:
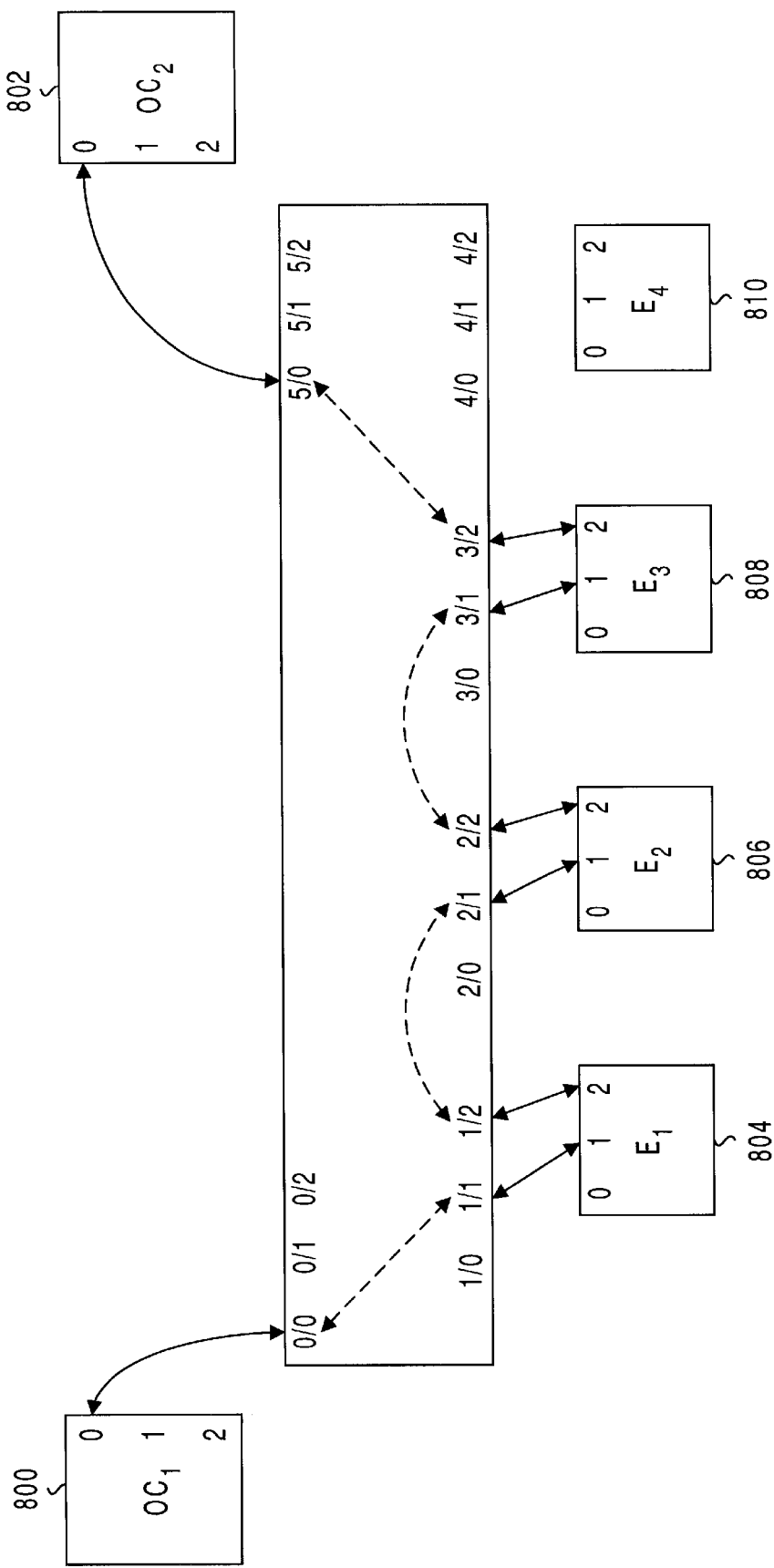

In the event that a particular interface card informs the TCC 300 that it wishes to be provisioned into the particular data circuit, the TCC 300 will update the cross-stitch matrix to add the particular interface card to that data circuit. For example, as illustrated in FIG. 9C, the second interface card 808 is provisioned into the first data circuit 850 (as defined in FIG. 9A) and is thus added to the cross-stitch matrix. The updated cross-stitch matrix is illustrated in the below table.

| Port/STS | Source Port/STS | Next Port/STS | Previous Port/STS |
|---|---|---|---|
| 0/0 | 1/1 | N/A | 1/2 |
| 0/1 | N/A | N/A | N/A |
| 0/2 | N/A | N/A | N/A |
| 1/0 | N/A | N/A | N/A |
| 1/1 | 0/0 | 2/1 | N/A |
| 1/2 | 2/1 | 0/0 | 2/2 |
| 2/0 | N/A | N/A | N/A |
| 2/1 | ½ | 3/1 | 1/1 |
| 2/2 | 3/1 | 1/2 | 3/2 |
| 3/0 | N/A | N/A | N/A |
| 3/1 | 2/2 | 5/0 | 2/1 |
| 3/2 | 5/0 | 2/2 | N/A |
| 4/0 | N/A | N/A | N/A |
| 4/1 | N/A | N/A | N/A |
| 4/2 | N/A | N/A | N/A |
| 5/0 | 3/2 | N/A | 3/1 |
| 5/1 | N/A | N/A | N/A |
| 5/2 | N/A | N/A | N/A |

The above functions of the NE, including the TCC, can be implemented by a set of computer instructions stored on a computer readable media.

The present system can be utilized in a variety of configurations supporting transport of data on MAN/LAN, interLATA and interexchange networks. Because the system can establish cross connections between any interface cards and can use a data plane 140 for local switching, a wide variety of transport configurations can be supported, including configurations in which a virtual LAN is created in the data plane 140, and access to the telecommunication plane 130 is granted for transport to other nodes.

Although this invention has been illustrated by reference to specific embodiments, it will be apparent to those skilled in the art that various changes and modifications may be made that clearly fall within the scope of the invention. The invention is intended to be protected broadly within the spirit and scope of the appended claims.

What is claimed:

1. A method for automatically provisioning data streams received by a network element to the devices within the network element that desire to receive the data stream, the method comprising:

requesting provisioning data for each of the devices within the network element;

receiving a response from each device, wherein the response indicates which of the data streams the device wants to receive;

organizing all of the responses so as to create a list of devices for each data stream;

computing a path for each data stream within the network element; and generating a matrix for each path, wherein for each leg of the path the matrix includes a source point and a destination point.

2. The method of claim 1, wherein the matrix also includes for each leg of the path a next point.

3. The method of claim 2, further comprising receiving a data stream at the network element and routing the data stream within the network element in accordance with the matrix for the data stream.

4. The method of claim 3, further comprising rerouting the data stream within the network element in accordance with the matrix for the data stream in the event that one or more devices within the network element that are defined in the matrix for that data stream become inoperable.

5. The method of claim 1, wherein the matrix also includes for each leg of the path a previous point.

6. The method of claim 1, wherein the matrix also includes for each leg of the path a next point and a previous point.

7. The method of claim 1, further comprising determining what devices are within the network element.

8. The method of claim 7, further comprising:

determining that additional devices have been added to the network element;

requesting provisioning data from the newly added devices;

receiving a response from each newly added device, wherein the response indicates which of the data streams the newly added device wants to receive; and updating the path and the matrix for each data stream to reflect those additional devices that desire to receive the data stream.

9. The method of claim 1, further comprising:

receiving a response from a devise that it no longer desires to receive particular data streams; and updating the path and the matrix for each data stream to reflect those devices that no longer desire to receive the data stream.

10. The method of claim 1, further comprising:

receiving a response from a device within the network element that originally did not want to receive a particular data stream that it desires to receive the particular data stream; and updating the path and the matrix for the particular data stream to reflect the newly provisioned device.

11. A method for routing data streams received at a network element to the appropriate devices within the network element, the method comprising:

determining devices installed within the network element;

requesting provisioning data from each of the installed devices;

receiving provisioning data from each of the installed devices, wherein the provisioning data includes the data streams the device wants to receive;

computing a path for each data stream within the network element, the path including multiple legs with each leg consisting of a source point and a destination point;

generating a matrix for each path, wherein the matrix includes a next destination point and a previous source point for each applicable leg; and routing a data stream to the appropriate devices within the network element based on the matrix for the data stream.

12. The method of claim 11, wherein said routing a data stream includes:

receiving the data stream at an initial destination point for the network element;

routing the data stream to the appropriate devices within the network element based on the matrix for the data stream; and transmitting the data stream from a final source point of the network element.

13. The method of claim 12, wherein said receiving the data stream includes receiving the data stream from an external source at a telecommunication card within the network element.

14. The method of claim 12, wherein said routing the data stream includes routing the data stream to the appropriate interface cards within the network element based on the matrix for the data stream.

15. The method of claim 12, wherein said transmitting the data stream includes transmitting the data stream from a telecommunication card within the network element to an external source.

16. The method of claim 11, further comprising determining that at least one of the devices within the network element is inoperable; and routing the data stream around the at least one inoperable device based on the matrix.

17. The method of claim 11, wherein the devices are interface cards.

18. The method of claim 17, wherein the interface cards include telecommunication cards.

19. The method of claim 18, wherein the telecommunication cards include Time Division Multiplexed (TDM) and Wavelength Division Multiplexed (WDM) cards.

20. The method of claim 18, wherein the telecommunication cards include SONET, SDH and PDH cards.

21. The method of claim 17, wherein the interface cards include data cards.

22. The method of claim 21, wherein the data cards include Ethernet, Token Ring and FDDI cards.

23. A computer program embodied on a computer readable medium for automatically provisioning data streams received by a network element to the devices within the network element that desire to receive the data stream, the computer program comprising:

a code segment for requesting provisioning data for each of the devices within the network element;

a code segment for receiving a response from each device, wherein the response indicates which of the data streams the device wants to receive;

a code segment for organizing all of the responses so as to create a list of devices for each data stream;

a code segment for computing a path for each data stream within the network element; and a code segment for generating a matrix for each path, wherein for each leg of the path the matrix includes a source point and a destination point.

24. The computer program of claim 23, further comprising a code segment for receiving a data stream at the network element and routing the data stream within the network element in accordance with the matrix for the data stream.

25. The computer program of claim 24, further comprising a code segment for rerouting the data stream within the network element in accordance with the matrix for the data stream in the event that one or more devices within the network element that are defined in the matrix for that data stream become inoperable.

26. The computer program of claim 23, further comprising a code segment for determining what devices are within the network element.

27. The computer program of claim 26, further comprising:

a code segment for determining that additional devices have been added to the network element;

a code segment for requesting provisioning data from the newly added devices;

a code segment for receiving a response from each newly added device, wherein the response indicates which of the data, streams the newly added device wants to receive; and a code segment for updating the path and the matrix for each data stream to reflect those additional devices that desire to receive the data stream.

28. The computer program of claim 23, further comprising:

a code segment for receiving a response from a devise that it no longer desires to receive particular data streams; and a code segment for updating the path and the matrix for each data stream to reflect those devices that no longer desire to receive the data stream.

29. The computer program of claim 23, further comprising:

a code segment for receiving a response from a device within the network element that originally did not want to,receive a particular data stream that it desires to receive the particular data stream; and a code segment for updating the path and the matrix for the particular data stream to reflect the newly provisioned device.

30. A computer program embodied on a computer readable medium for routing data streams received at a network element to the appropriate devices within the network element, the computer program comprising:

a code segment for determining devices installed within the network element;

a code segment for requesting provisioning data from each of the installed devices;

a code segment for receiving provisioning data from each of the installed devices, wherein the provisioning data includes the data streams the device wants to receive;

a code segment for computing a path for each data stream within the network element, the path including multiple legs with each leg consisting of a source point and a destination point;

a code segment for generating a matrix for each path, wherein the matrix includes a next destination point and a previous source point for each applicable leg; and a code segment for routing a data stream to the appropriate devices within the network element based on the matrix for the data stream.

31. The computer program of claim 30, further comprising a code segment for determining that at least one of the devices within the network element is inoperable; and a code segment for routing the data stream around the at least one inoperable device based on the matrix.

32. The method of claim 30, wherein said code segment for routing a data stream routing the data stream to the appropriate interface cards within the network element based on the matrix for the data stream.

33. A network element capable of automatically provisioning a data circuit, the network element including
   a plurality of interface cards for receiving and transmitting data streams;
   a cross-connect for connecting each of the plurality of interface cards to each other;
   a backplane for connecting each of the plurality of interface cards to the cross-connect; and
   a control unit for controlling the operation of the network element including
      requesting and receiving provisioning data from the plurality of interface cards,
      defining a data circuit based on the interface cards wishing to receive a particular data stream,
      determining a path for the particular data stream to follow in order to traverse each interface card within the data circuit,
      defining the path in a matrix for the cross-connect to use in routing the data stream, wherein the matrix includes for each port of the cross-connect associated with an interface card that is part of the data circuit a source port and a destination port, and
      storing the matrix.

34. The network element of claim 33, wherein said plurality of interface cards include SONET cards.

35. The network element of claim 33, wherein said plurality of interface cards include Ethernet cards.

36. The network element of claim 33, wherein the matrix additionally includes a next destination port for the applicable ports.

37. The network element of claim 33, wherein the matrix additionally includes a previous port for the applicable ports.

38. The network element of claim 33, wherein the cross-connect utilizes the matrix to route data streams around inoperable interface cards.

39. An apparatus for generating a matrix that defines how a data stream should be routed within a network element, the apparatus comprising:
   means for obtaining provisioning data from a plurality of interface cards;
   means for defining a data circuit based on the obtained provisioning data as those interface cards desiring to receive the data stream;
   means for determining an order for the data stream to traverse all the interface cards within the data circuit; and
   means for generating the matrix based on the order.

40. The apparatus of claim 39, wherein said means for determining an order includes means for providing a next destination point for those interface cards that have at least two interface cards following in the order.

41. The apparatus of claim 39, wherein said means for determining an order includes means for providing a prior point for those interface cards that have received the data stream from an interface card within the data stitch.

* * * * *